No. 679,631. Patented July 30, 1901.
G. W. MANSON.
MUD GUARD FOR BICYCLES.
(Application filed Nov. 17, 1900.)
(No Model.)
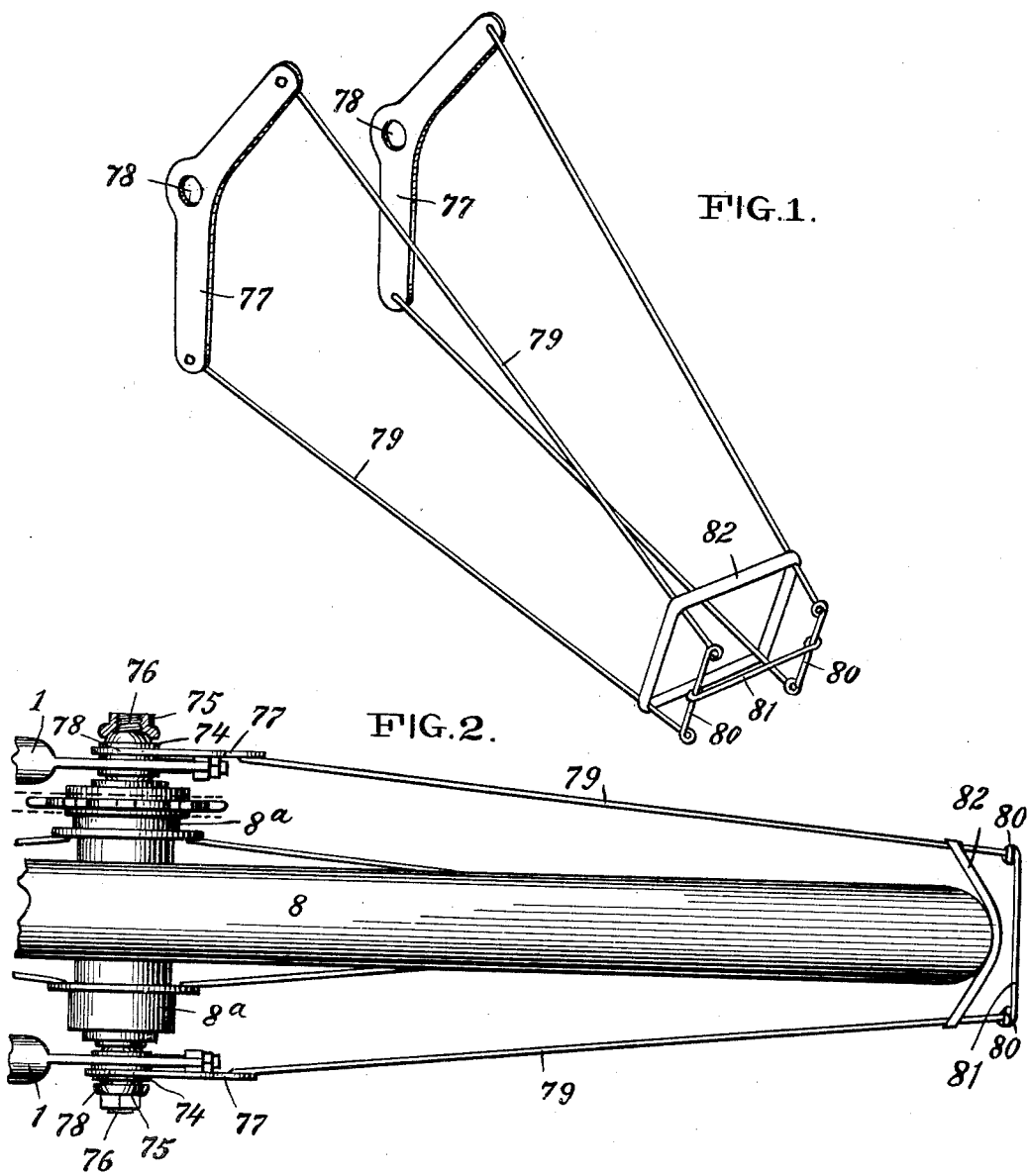

UNITED STATES PATENT OFFICE.

GEORGE W. MANSON, OF NEW YORK, N. Y.

MUD-GUARD FOR BICYCLES.

SPECIFICATION forming part of Letters Patent No. 679,631, dated July 30, 1901.

Application filed November 17, 1900. Serial No. 36,846. (No model.)

*To all whom it may concern:*

Be it known that I, GEORGE W. MANSON, a citizen of the United States, and a resident of the borough of Manhattan, in the city and State of New York, have invented a new and useful Mud-Guard for Bicycles and other Vehicles, of which the following is a specification.

My invention relates to a mud-guard or mud-remover readily applicable to the wheels of bicycles and other vehicles and adapted to automatically remove and discharge mud from the tire of the wheel and prevent it being thrown upward upon the rider by centrifugal action.

In the accompanying drawings, Figure 1 is a perspective view of the mud-guard detached. Fig. 2 is a plan view of a portion of a bicycle-wheel with the mud-guard in position.

1 1 represent parts of the frame of a bicycle, and 8 the rear or drive wheel, mounted in the said frame by its hub $8^a$ in the customary manner. The spindle on which the wheel runs is fixed in the frame by means of washers 74, having convex external faces and nuts 75 screwed on the threaded ends 76 of the fixed spindle, having concave inner faces to fit the convexity of the washers and permit them to adapt themselves automatically to the plate or portion of the frame against which they are clamped.

My novel mud-guard is constructed with a pair of rigid bars 77, having in their centers perforations 78 to fit over the respective ends 76 of the wheel axle or spindle, and with a pair of bent-wire frames, each consisting of converging arms 79, attached at their forward ends to the extremities of the bars 77 and united at their rear ends, as shown at 80. The rear ends of the united arms are connected by a horizontal stay-wire 81.

82 represents a flexible band, preferably of india-rubber, which is stretched over the assembled arms 79 in the position shown in Fig. 1.

To place the mud-guard in position on the cycle, the nuts 75 and washers 74 are removed from the ends of the fixed shaft or spindle and the bars 77 placed with their apertures 78 on the spindle ends. The washers 74 and nuts 75 being then replaced, the bars 77 are clamped rigidly and immmovably on the frame, with the arms 79 projecting horizontally backward and the elastic band 82 stretched across the tire of the wheel in the position shown in Fig. 2. The elasticity of the band 82 adapts it to retain this position by friction on the arms 79, and it thus effectually scrapes the outer periphery of the wheel as the latter rotates and removes the mud therefrom without appreciable resistance to the movement.

This mud-guard is applicable in the same manner to both the front and rear wheels of a bicycle and to the wheels of other cycles or vehicles.

Having thus described my invention, the following is what I claim as new therein and desire to secure by Letters Patent:

The combination of the rigid supporting-bars 77, a pair of bent-wire frames comprising converging arms 79 attached at their forward ends to the extremities of the bars 77, and connected at their rear ends, a horizontal stay-wire 81 connecting the rear ends of the united arms, and a flexible band secured around said arms in proper position to act as a scraper.

GEORGE W. MANSON.

Witnesses:
 OCTAVIUS KNIGHT,
 WM. P. HAMMOND.